US010373162B2

(12) United States Patent
Senci et al.

(10) Patent No.: US 10,373,162 B2
(45) Date of Patent: Aug. 6, 2019

(54) SYSTEMS AND METHODS FOR VALIDATING DATA ELEMENTS OF A TRANSMITTED COMPUTER MESSAGE

(71) Applicant: MasterCard International Incorporated, Purchase, NY (US)

(72) Inventors: David J. Senci, Troy, IL (US); Peng Yang, Chesterfield, MO (US)

(73) Assignee: Mastercard International Incorporated, Purchase, NY (US)

( * ) Notice: Subject to any disclaimer, the term of this patent is extended or adjusted under 35 U.S.C. 154(b) by 689 days.

(21) Appl. No.: 15/005,829

(22) Filed: Jan. 25, 2016

(65) Prior Publication Data

US 2017/0213214 A1 Jul. 27, 2017

(51) Int. Cl.
*G06Q 20/40* (2012.01)
*H04L 29/06* (2006.01)

(52) U.S. Cl.
CPC ........... *G06Q 20/401* (2013.01); *H04L 69/22* (2013.01); *H04L 69/28* (2013.01)

(58) Field of Classification Search
CPC ........ G06Q 20/401; H04L 69/22; H04L 69/28
See application file for complete search history.

(56) References Cited

U.S. PATENT DOCUMENTS

| 4,930,093 A | 5/1990 | Houser et al. | |
|---|---|---|---|
| 7,107,242 B1 * | 9/2006 | Vasil | G06Q 20/10 705/35 |
| 2003/0212632 A1 | 11/2003 | Keogh et al. | |
| 2006/0287902 A1 * | 12/2006 | Helsper | G06Q 30/06 235/382 |
| 2007/0228144 A1 * | 10/2007 | Knackstedt | G06Q 20/00 235/376 |
| 2008/0122624 A1 * | 5/2008 | Balinsky | G06K 7/0008 340/572.1 |
| 2009/0144076 A1 | 6/2009 | Berstis | |
| 2011/0087458 A1 | 4/2011 | Clementi et al. | |
| 2012/0317025 A1 * | 12/2012 | Wong | G06Q 20/027 705/42 |
| 2014/0344300 A1 | 11/2014 | Garcia | |
| 2014/0372308 A1 * | 12/2014 | Sheets | G06Q 20/40 705/44 |
| 2015/0254665 A1 * | 9/2015 | Bondesen | G06Q 20/3672 705/44 |
| 2015/0294316 A1 | 10/2015 | Eisen | |
| 2016/0210633 A1 * | 7/2016 | Epelman | G06Q 20/4016 |
| 2017/0193479 A1 * | 7/2017 | Kamat | G06Q 20/18 |
| 2017/0372294 A1 * | 12/2017 | Pelletier | G06Q 20/3224 |

* cited by examiner

*Primary Examiner* — Gary Mui
(74) *Attorney, Agent, or Firm* — Armstrong Teasdale LLP

(57) ABSTRACT

Systems and methods for validating and adjusting local transaction times are provided. A host computing system includes a processor and a memory in communication with the processor. The host computing system receives a computer message comprising authorization data associated with a transaction, the authorization data including a location identifier and a local transaction time set by a remote computing device used in processing the transaction. The host computing system also appends a header including a header processor time to the computer message, determines a time zone associated with the local transaction time based on the location identifier, converts the header processor time to a local header processor time based on the time zone, and determines that the local transaction time is validated based on the local header processor time.

33 Claims, 10 Drawing Sheets

IntraHourDifferenceInSeconds(LocalHeaderProcessorTime, LocalTransactionTime) =

(minute(LocalHeaderProcessorTime) * 60 + second(LocalHeaderProcessorTime)
- minute(LocalTransactionTime) * 60 - second(LocalTransactionTime) + T ) % T

If IntraHourDifferenceInSeconds <= threshold adjustedLocalTransactionDateTime = localHeaderProcessorDateTime – intraHourDifferenceInSeconds else adjustedLocalTransactionDateTime = localHeaderProcessorDateTime

SYSTEMS AND METHODS FOR VALIDATING DATA ELEMENTS OF A TRANSMITTED COMPUTER MESSAGE

BACKGROUND

The field of the disclosure relates generally to validating data elements of a transmitted computer message and, more particularly, to network-based systems and methods for ensuring that computer messages generated at remote computing devices include a verified local time and date of when the message was generated at the remote computing device.

At least some known computer messages are generated at remote computing devices and are sent to a host or server computing device for further processing. These computer messages may include data relating to an event that has occurred including, for example, a payment transaction. In the transaction example, the transaction occurs and the computer message is sent as authorization data to a host or server computing device. This authorization data may include, among other data elements, a local transaction date and time (the "local transaction time"). The local transaction time within the authorization data is the internal time kept by the remote computing device (i.e., the time of the internal clock in the remote computing device). The local transaction time is typically used by the host device to ensure data integrity associated with the transaction, to sort cardholder transactions and/or for other internal evaluations. The host may not be the only entity that uses the local transaction time for these purposes.

In some instances, the time set at the remote computing device is not set properly, leading to incorrect local times associated with the generated computer messages. The remote computing device's time may be set incorrectly for multiple reasons including incorrect manual adjustment of the time setting within the remote computing device, failure to update the time setting by the operator of the remote computing device as a result of switching to or from Daylight Savings Time or after a power outage, or a faulty internal clock. An improper time setting at the remote computing device may lead to incorrect local transaction times recorded at the host or server computing device. Incorrect local transaction times may lead to internal problems such as, poor data integrity, inability to correctly sort data, and inaccurate determination if the merchant is opened or closed.

One known method of verifying the local transaction time provided by a remote computing device with a computer message is to manually compare the received local transaction time to an accurate local transaction time. Manually comparing a received local transaction time to an accurate local transaction time is time consuming, requires extra resources, and increases operation costs. It may also lead to human errors. Accordingly, it would be desirable to have a system that automatically verifies a received local transaction time when the computer message is received by the host or other interested party receiving the data from the remote computing device.

BRIEF DESCRIPTION OF THE DISCLOSURE

In one aspect, a host computing system for validating and adjusting local transaction times is provided. The host computing system includes a processor and a memory in communication with the processor. The host computing system receives a computer message comprising authorization data associated with a transaction, the authorization data including a location identifier and a local transaction time set by a remote computing device used in processing the transaction. The host computing system also appends a header including a header processor time to the computer message, determines a time zone associated with the local transaction time based on the location identifier, converts the header processor time to a local header processor time based on the time zone, and determines that the local transaction time is validated based on the local header processor time.

In another aspect, a computer-implemented method for validating a local transaction time of a computer message is provided. The computer-implemented method may be performed by a host computing system. The method includes receiving a computer message comprising authorization data associated with a transaction, the authorization data including a location identifier and a local transaction time set by a remote computing device used in processing the transaction. The method further includes appending a header including a header processor time to the computer message, determining a time zone associated with the local transaction time based on the location identifier, converting the header processor time to a local header processor time based on the time zone, and determining that the local transaction time is validated based on the local header processor time.

In yet another aspect, at least one non-transitory computer-readable storage media having computer-executable instructions embodied thereon is provided. When executed by at least one processor, the computer-executable instructions cause the processor to receive a computer message comprising authorization data associated with a transaction, the authorization data including a location identifier and a local transaction time set by a remote computing device used in processing the transaction. The computer-executable instructions further cause the processor to append a header to the computer message, wherein the header includes a header processor time, determine a time zone associated with the local transaction time based on the location identifier, convert the header processor time to a local header processor time based on the time zone, and determine that the local transaction time is validated based on the local header processor time.

BRIEF DESCRIPTION OF THE DRAWINGS

The Figures listed below show example embodiments of the methods and systems described herein.

FIG. 9 is an example formula for calculating an intra hour difference in seconds using a local header processor time and a local transaction time.

FIG. 10 is an example formula for adjusting a local transaction time.

DETAILED DESCRIPTION OF THE DISINVENTION

Figure 1:
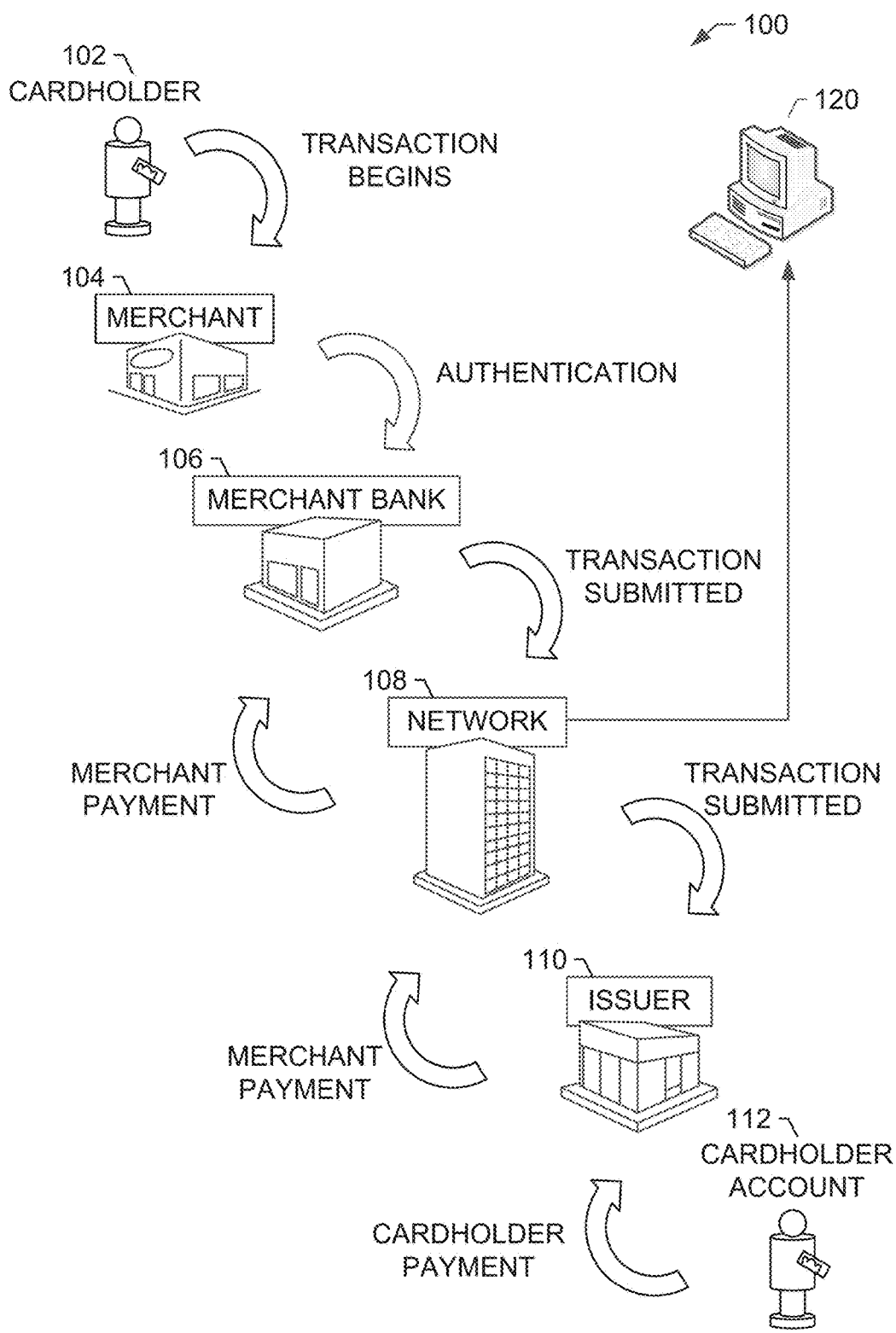
FIG. 1 is a schematic diagram illustrating an example multi-party payment card industry system with a message validator computing device for processing and validating payment-by-card transactions

The present embodiments are directed to systems and methods for validating and adjusting computer messages generated and sent from a remote computing device to a host device. More specifically, the systems and methods described herein are configured to receive a computer message from a remote computing device wherein the computer message includes a local date and time (collectively referred to herein as "local time") the message was generated by the remote device, determine whether the received local time included within the message is substantially the same as an actual local time, and adjust the received local time within the message if the received local time is different from the actual local time by a predetermine amount of time.

The "computer message validation and payment processor platform" described herein includes a payment processor and a message validator computing device that is in communication with the payment processor. The message validator computing device is configured to validate a received local time associated with a computer message by comparing the received local time to a host approved local time (also known as the local header processor time). In the example embodiment, the host is the computing device receiving the computer message. In the example embodiment, the host is one or both of the payment processor and the message validator computing device.

When the compared times (e.g., the received local time and the local header processor time) are substantially similar (for example, within 15 seconds of one another), the received local time is considered validated. When the compared times are not substantially similar, the received local time is adjusted to the local header processor time. The "computer message validation and payment processor platform" described herein includes (a) a payment processor, (b) a message validator computing device in communication with the payment processor, (c) at least one point-of sale (POS) device associated with one or more merchants (also referred to as a remote computing device), (d) at least one acquiring bank computing device having a memory, (e) at least one issuing bank computing device having a memory, and (f) a cardholder computing device.

The cardholder is someone with the authority to use a payment card issued by an issuing bank to initiate payment transactions that are processed by the payment network. The cardholder includes multiple cardholders each having one or more payment cards issued to them by one or more issuing banks. As long as the cardholder has authority to use the payment card for the selected transaction, the transaction is valid.

The merchant typically trades in goods and/or services and may be located physically and/or virtually. An example of a merchant located physically would be a brick and mortar store. An example of a merchant located virtually would be the online offerings at store.com. The merchant offers goods and/or services for sale, and these goods and/or services are typically purchased by the cardholder. Typically, the remote computing device is located within the merchant or is associated with the merchant (e.g., a website of the merchant) and is referred to as a POS device. The POS device could be an actual computing device located within a brick and mortar store where a payment card is swiped or plunged for initiating payment, or it could be a website hosted by a computing device that allows a cardholder to enter their payment data into a user interface to initiate an online purchase of items through the website.

The remote computing device includes (a) a memory, (b) a processor, (c) a user input, and (d) an output. The remote computing device is typically located within the merchant or is associated with the merchant. The remote computing device facilitates interaction between the merchant, the cardholder and the acquiring bank. As described above, the remote computing device may be a point of sale (POS) in some example embodiments (i.e., the checkout kiosk or checkout page online). The POS may be located physically within the merchant (i.e., in a coffee shop, clothing store, or restaurant) or may be an online presence (i.e. a page presented to the cardholder while on amazon, esty, or overstock.com). The remote computing device captures and transmits authorization data associated with a transaction. The authorization data includes the local transaction time which is generated by the remote device.

The remote computing device memory may, temporarily or permanently, store data received from the payment card associated with the transaction, data received from the issuing bank regarding the determination the issuing bank reached for the transaction (approved or denied), and/or data regarding individual transactions. The remote computing device processor parses this stored authorization data. For example, the remote computing device processor may parse the data stored within the remote computing device memory to determine how many denials occurred within a day at a particular POS. The user input is an interface for the user of the remote computing device. The user input may be, for example, a key board, a touch screen or a stylus. The user input allows the user (a salesperson associated with the merchant or the cardholder) to input data regarding the transaction (i.e., items being purchased during the transaction). The output is a display for data to be presented to the user of the remote computing device. For example, the output may display a message to the user of the POS that the transaction has been denied. In some instances the user input and the output may be the same.

The acquiring bank is the bank associated with the merchant. If the transaction is approved, the funds from the cardholder's account are moved to the merchant's account at the acquiring bank. The acquiring bank computing device includes (a) a memory, (b) a processor, (c) a user input, and (d) an output. The acquiring bank memory stores data received from the merchant typically via the remote computing device. This data is typically authorization data. It may include data relating to a transaction, such as, the cardholder name, the payment card account number, transaction items, location of the merchant associated with the transaction, and the time associated with the transaction. The acquiring bank computing device processor parses this stored data. For example, to determine the amount of transactions that occur at a particular merchant within a day, the total amount of cash made by a particular merchant within a day, and/or the average amount of transactions per day associated with a particular merchant. The user input is an interface for a user associated with the acquiring bank (i.e., an employee of the bank). The user input may be, for example, a key board, a touch screen or a stylus. The output is a display for the data to be presented to the user of a device associated with the acquiring bank. For example, the output may display to the user that there have been an above average amount of transactions for a particular merchant on a particular day. In some instances the user input and the output may be the same instrument.

The at least one issuing bank is the bank associated with the cardholder. The issuing bank computing device includes (a) a memory, (b) a processor, (c) a user input, and (d) an output. The issuing bank may store in the memory the received authorization request message from the merchant for approving or denying the transaction. The issuing bank memory further stores data relating to the cardholder such as, account number, amount of funds within the account, and standing of the account. The issuing bank processor typically parses the stored data then makes a determination (i.e., to approve or deny the transaction) based on available funds of the cardholder, standing of the holder (i.e., good or bad standing), and if the cardholder has an account at the issuing bank. If the issuing bank processor approves the transaction the funds are transferred to the merchant and the transaction is completed. The issuing bank processor may send a message to the remote computing device indicating that the transaction has been approved. If the issuing bank processor denies the request, the issuing bank processor may send a message to the remote computing device indicating that the transaction has been denied. The user input is an interface for a user associated with the issuing bank (i.e., an employee of the bank). The user input may be, for example, a key board, a touch screen or a stylus. The output is a display for the data to be presented to the user of a device associated with the issuing bank. For example, the output may display to the user that there have been an above average amount denials on a particular day. In some instances, the user input and the output may be the same instrument.

The payment network, also sometime referred to as an interchange network, allows the host or payment processor server to interact with the remote computing device, the acquiring bank computing device, and the issuing bank computing device. The payment processor includes (a) a database, (b) a processor, (c) a user input, and (d) an output. The payment processor is the host device that processes payment card transactions. The payment processor database stores data received from the acquiring bank, the issuing bank and the remote computing device, data such as, local transaction time, amount of the transaction, cardholder name, cardholder account number, payment card number, remote computing device ID, and merchant location associated with transaction. The processor then parses this data to determine, for example, if the data is reliable, the balance at the end of a period (i.e., a clearing period, this would determine what the credit card company is owed at the end of the day), or high periods of transactions (i.e., more transactions occur on Sunday afternoon then Tuesday morning). The user input is an interface for a user associated with the payment processor (i.e., an employee of the host). The user input may be, for example, a key board, a touch screen or a stylus. The output is a display for the data to be presented to the user of a device associated with the payment processor. For example, the output may display to the user a notification that data integrity is poor. In some instances, the user input and the output may be the same instrument.

The time adjustment table is stored at the payment processor database. The adjustment table typically includes data fields such as (a) merchant ID, (b) remote computing device ID, (c) the acquiring bank ID, (d) the type of adjustment (date or time), (e) the amount of the adjustment, and (f) the payment card number. The type of adjustment may either be a date or time adjustment. A date adjustment occurs when the computer message reports the transaction time with the incorrect day. In some embodiments, this may occur when the time reported is greater than twenty-four hours different then the accurate time. A time adjustment is when the time reported is different than the accurate time but on the same day. In some embodiments, this may occur when the time reported is less then twenty-four hours different then the accurate time but the reported time is not the accurate time.

In some embodiments, the computer message validation and payment processor platform may be initiated with a "swipe" of a payment card. As used herein, the term "swipe" a payment card includes a physical swipe of an actual payment card within a reader of the remote computing device, or any other action used to gather account data from a cardholder and send to the POS device. The cardholder initiates the transaction between the cardholder and the merchant by "swiping" the payment card at the remote computing device associated with a merchant. Once the card is swiped the remote computing device collects data associated with the transaction and formats the data into an authorization request message. The data collected includes, at least, an account ID (PAN), a transaction amount, a merchant ID, and a local transaction date and time (collectively referred to herein as "local transaction time"). The authorization message is then sent to the acquiring bank associated with the merchant. Once the acquiring bank has parsed and/or stored the received data. The acquiring bank sends the data to the associated payment processor over the payment network. The data may be in the same form as when it reached the acquiring bank or the acquiring bank may change the form of the data before sending the data to the payment processor.

At the payment processor, the authorization request message is directed to the message validator computing device for validation of the local transaction time included within the message. Specifically, when the authorization request message is received by the message validator computing device, the message validator computing device assigns a "header processor time" to the transaction. The header processor time is assigned based on the internal clock at the host device (i.e., the message validator computing device and/or the payment processor) and represents the time the message is received by the host device. In the example embodiment, the header processor time is based on the U.S. Central Time Zone. The header processor time is automatically saved and embedded in a header field within the authorization request message. The host device then adjusts the header processor time to account for any time zone changes between the location of the host device and the location of the remote computing device. This adjusted time is labeled as the "local header processor time" and is saved within the host memory. This local header processor time should reflect the local time of the remote computing device plus any transmission time for sending the message if the internal clock of the POS device is accurate.

The message validator computing device then compares the local transaction time included within the authorization request message sent from the acquiring bank to the local header processor time as determined by the message validator computing device. When the times are substantially the same (i.e., within a predefined threshold determined by the host device), in this example embodiment, within six seconds, the local transaction time is validated and then stored within the memory. When the times are not substantially the same (i.e., a difference greater than six seconds), the local transaction time is adjusted to the local header processor time and then stored within memory.

The authorization request message with either the validated local transaction time or the adjusted local transaction time is then sent to the issuing bank associated with the cardholder via the payment processor so that the issuing bank can further process the transaction including either approving or denying the transaction. The issuing bank makes this determination based on factors including, if the cardholder has an account with the issuing bank, if the cardholder's account currently has enough funds to cover the transaction, and if the cardholders account is in good standing. If the issuing bank determines the cardholder has the proper funds and approves the transaction the issuing bank will send the approval via an authorization response message to the payment processor. The payment processor sends the authorization response message to the acquiring bank. The acquiring bank sends this data to the remote computing device associated with the merchant where the transaction was initiated and the transaction is completed. When the issuing bank denies the transaction the issuing bank sends a denial response message to the payment processor, and the processor sends the message to the acquiring bank. The acquiring bank sends the message to the remote computing device. The remote computing device then provides the message to the user of the remote computing device.

At least one of the technical problems addressed by this system may include: (i) poor data integrity of data the payment processor receives from the remote computing device and/or the acquiring bank; (ii) inaccuracy of the local transaction time, including transactions with chip cards; (iii) difficulty in assessing acquiring banks and/or merchants on how well they are meeting the stipulated accuracy requirements set by the payment processor host; and (iv) consistently inaccurate local transaction times associated with a merchant or more specifically, a remote computing device.

The technical effect achieved by this system may be at least one of: (i) improving data integrity the payment processor receives from the remote computing device and/or the acquiring bank; (ii) improving accuracy of the local transaction time received from the remote computing device and/or the acquiring bank; (iii) improving authorization data associated with the acquiring bank and/or remote computing device; and (iv) improving the acquiring bank and/or the merchant awareness of inaccurate local transaction time associated with authorization data.

More specifically, the technical effects can be achieved by performing at least one of the following steps: (a) comparing at the message validator computing device (or in other embodiments, the acquiring bank or the issuing bank) the received local transaction time and the local header processor time as determined by the message validator computing device; (b) determining based on the comparison if the local transaction time should be validated or adjusted; (c) validating the local transaction time; (d) adjusting the local transaction time; (e) storing the results of the comparison between the received local transaction time and the actual transaction time as determined by the message validator in the database; (f) storing the adjustment record within the message validator database; (g) informing the remote computing device of a discrepancy; (h) informing the acquiring bank of the discrepancy; (i) setting the time at the remote computing device to the actual time when necessary; (j) maintaining a time adjustment table; (k) providing an average time adjustment of each terminal ID; and (l) correcting the received local transaction time upon receipt of the computer message.

As used herein, the term "local transaction time" refers to the time at which the transaction is initiated at the POS device and recorded by the internal clock of the POS device. A POS device typically has an internal clock. The internal clock maintains the time for the POS device. The internal clock may come pre-set, and may be altered by the operator of the POS device. Accordingly, the internal clock time of a POS device may be accurately set or may be inaccurately set. The internal clock time is dependent on those who manage the POS. An improper time setting may occur due to Daylight Savings, relocation of the POS from one time zone to another time zone, the user setting the internal clock on the POS incorrectly, or the user never changing the internal clock of the POS from the original factory setting.

As used herein, the term "header processor time" refers to a time associated with a transaction as determined by the message validator computing device and is considered to be accurate. The header processor time is set and kept at an internal clock at the payment processor or the message validator computing device (e.g., host device) that receives the authorization request message (i.e., computer message). In the example embodiment, the header processor time is the time recorded when the message validator computing device receives the authorization request message. In other embodiments, the header processor time may be a different time associated with the transaction. In the example embodiment, the internal clock of the host device is set to the Central Time Zone. When a computer message is received at the host device a header is appended to the authorization request message. The header processor time is a portion of the header appended to the authorization request message. The local transaction time should substantially match the header processor time plus any adjustments for time zone differences between the location of the host device and the location of the remote computing device.

As used herein, the terms "local header processor time" refers to the header processor time which is converted to account for time zone changes between the host device and the remote computing device. In other words, the local header processor time is the header processor time after it has been converted to the time zone associated with the remote computing device location time zone. For example, the header processor time is 11:00:00 PM Central Time. The remote computing device is in the Western Time Zone. The header processor time would then be converted to Western Time and the local header processor time would be 9:00:00 PM. When the local transaction time and the local header processor time are within a predetermined range (a range of time predetermined by the host) of one another, the message validator computing device is able to accumulate reliable data enabling the payment processor to better identify, for example, when the merchant associated with the POS is open, when peak periods of transactions for the merchant are occurring, and other merchant-related data.

As used herein, a "processor" may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, or to a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL®, IBM® DB2, Microsoft® SQL Server, Sybase®, and PostgreSQL. However, any database may be used that enables the systems and methods described herein. (Oracle and MySQL are registered trademarks of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.) As used herein, the term "database system" refers specifically to a RDBMS.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the invention by way of example and not by way of limitation. It is contemplated that the invention has general application to managing computing infrastructures.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an example multi-party payment card industry system 100 with a message validator computing device for processing and validating payment-by-card transactions. Embodiments described herein may relate to transaction card system, such as a credit card payment system using the MasterCard® interchange network. The MasterCard® interchange network is a proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 102, who uses the transaction card to tender payment for a purchase from a merchant 104. To accept payment with the transaction card, merchant 104 must normally establish an account with a financial institution that is part of the financial payment system. This financial institution is usually called the "merchant bank," the "acquiring bank," or the "acquirer." When cardholder 102 tenders payment for a purchase with a transaction card, merchant 104 requests authorization from a merchant bank 106 for the amount of the purchase. The request may be performed over the telephone, but is usually performed through the use of a point-of-sale terminal, which reads cardholder's 102 account information from a magnetic stripe, a chip, or embossed characters on the transaction card and communicates electronically with the transaction processing computers of merchant bank 106. Alternatively, merchant bank 106 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 108, computers of merchant bank 106 or merchant processor will communicate with computers of an issuer bank 110 to determine whether cardholder's 102 account 112 is in good standing and whether the purchase is covered by cardholder's 102 available credit line. Based on these determinations, the request for authorization will be declined or accepted. If the request is accepted, an authorization code is issued to merchant 104.

When a request for authorization is accepted, the available credit line of cardholder's 102 account 112 is decreased. Normally, a charge for a payment card transaction is not posted immediately to cardholder's 102 account 112 because bankcard associations, such as MasterCard International Incorporated®, have promulgated rules that do not allow merchant 104 to charge, or "capture," a transaction until goods are shipped or services are delivered. However, with respect to at least some debit card transactions, a charge may be posted at the time of the transaction. When merchant 104 ships or delivers the goods or services, merchant 104 captures the transaction by, for example, appropriate data entry procedures on the point-of-sale terminal. This may include bundling of approved transactions daily for standard retail purchases. If cardholder 102 cancels a transaction before it is captured, a "void" is generated. If cardholder 102 returns goods after the transaction has been captured, a "credit" is generated. Interchange network 108 and/or issuer bank 110 stores the transaction card information, such as a type of merchant, amount of purchase, date of purchase, in a database 208 (shown in FIG. 2).

After a purchase has been made, a clearing process occurs to transfer additional transaction data related to the purchase among the parties to the transaction, such as merchant bank 106, interchange network 108, and issuer bank 110. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 104, merchant bank 106, and issuer bank 110. Settlement refers to the transfer of financial data or funds among merchant's 104 account, merchant bank 106, and issuer bank 110 related to the transaction. Usually, transactions are captured and accumulated into a "batch," which is settled as a group. More specifically, a transaction is typically settled between issuer bank 110 and interchange network 108, and then between interchange network 108 and merchant bank 106, and then between merchant bank 106 and merchant 104.

In the example embodiment, the multi-party payment card industry system 100 includes a message validator computing device 120 that is in communication with interchange network 108 (also referred to as payment processor). The message validator computing device 120 is configured to (i) receive authorization request messages that are being processed by interchange network 108 wherein the authorization request message includes a local transaction time generated by the POS device and stored within a header field of the authorization request message, (ii) determine a header processor time, also known as the actual transaction time, using the internal clock of the message validator computing device, (iii) adjust the header processor time based on the authorization request message to generate a local header processor time to reflect a local time of the POS device, (iv) compare the local transaction time to the local header processor time, and/or (v) determine whether or not to validate the local transaction time based on the comparison. In certain embodiments, interchange network 108 may be configured to provide at least some of the features of the message validator computing device 120.

Figure 2:
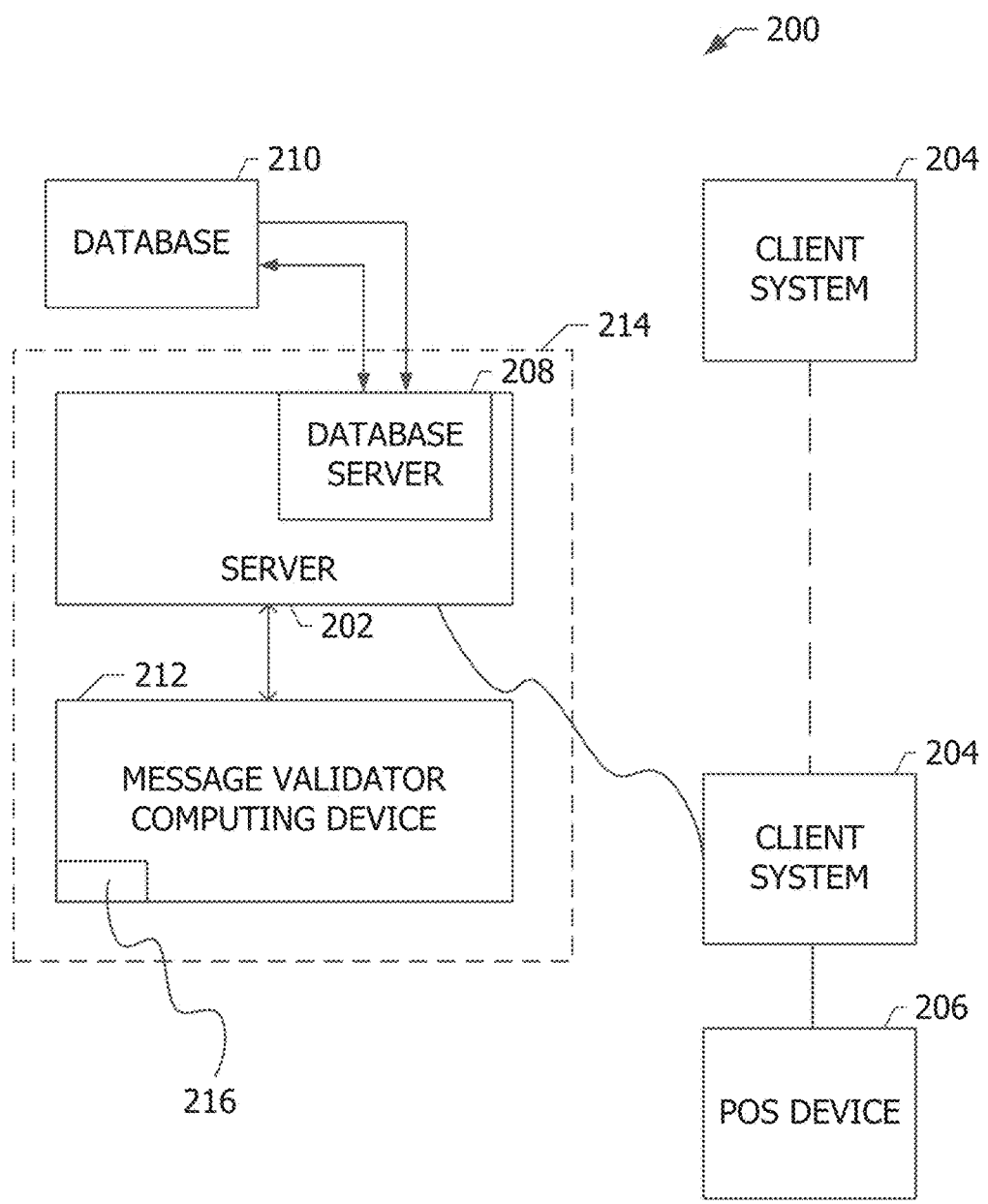
FIG. 2 is a simplified block diagram of an example computer message validation and payment processor platform in accordance with one embodiment of the present disclosure.

FIG. 2 is a simplified block diagram of an exemplary system 200 in accordance with one embodiment of the present invention. In one embodiment, system 200 is a payment card system used for implementing, for example, customized issuer-merchant relationships while also processing historical data associated with the transactions. In another embodiment, system 200 is a payment card system, which can be utilized by account holders for inputting processing codes to be applied to payment transactions.

More specifically, in the example embodiment, system 200 includes a server system 202, and a plurality of client sub-systems, also referred to as client systems 204, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment.

In the example embodiment, at least one client system 204 is in communication with a POS device 206. POS device 206 is configured to capture and transmit authorization data associated with one or more transactions. In some embodiments, POS device 206 may be located at a merchant. Alternatively, POS device 206 may capture authorization data associated with remote (e.g., online) transactions. In the example embodiment, POS device 206 has an internal clock (not shown). In other embodiments, POS device 206 is in communication with a remote computing device (e.g., client systems 204) that includes a clock. For each transaction, POS device 206 generates a local transaction time based on the internal clock. The local transaction time is stored in a header of a computer message associated with the transaction. In the example embodiment, the computer message is an authorization request message. The authorization request message includes data for processing and authorizing an associated transaction. For example, the authorization request message may include a merchant identifier (e.g., a merchant's name or address), a cardholder identifier, a PAN, a date, and the local transaction time associated with the transaction. In other embodiments, the computer message may be a different type of message associated with a transaction.

System 200 further includes a database server 208 connected to a database 210 containing information on a variety of matters, as described below in greater detail. In one embodiment, centralized database 210 is stored on server system 202 and can be accessed by potential users at one of client systems 204 by logging onto server system 202 through one of client systems 204. In an alternative embodiment, database 210 is stored remotely from server system 202 and may be non-centralized.

As described below, database 210 stores transaction data generated as part of sales activities conducted over the bankcard network including data relating to merchants, account holders or customers, and purchases. Database 210 further includes data relating to rewards programs and special offers including processing codes and business rules associated with the different rewards programs and special offers.

In the example embodiment, server system 202 is in communication with a message validator computing device 212. As used herein, server system 202 and message validator computing device 212 may be referred to collectively as a host computing system 214. The functions described herein of host computing system 214 may be performed by server system 202 and/or message validator computing device 212. Host computing system 214 is configured to receive authorization request messages from client systems 204 and/or POS device 206. Host computing system 214 includes an internal clock for capturing or generating a header processor time for each received authorization request. In the illustrated embodiment, message validator computing device 212 includes internal clock 216. The header processor time is associated with a time captured from internal clock 216 when an authorization request message is received.

Host computing system 214 is further configured to adjust the header processor time to account for differences between the local transaction time and the header processor time. For example, POS device 206 capture a local transaction time in a different time zone relative to host computing system 214 and internal clock 216. Host computing system 214 may be configured to examine the authorization request message to determine how to adjust the header processor time as described further herein. Host computing system 214 adjusts the header processor time to generate a local header processor time. In some embodiments, host computing system 214 may not adjust the header processor time. For example, the local transaction time and the header processor time may be associated with the same time zone. Host computing system 214 is configured to compare the local transaction time to the local header processor time to determine a difference between the local transaction time to the local header processor time. If the difference is greater than a predefined threshold (e.g., sixty seconds), host computing system 214 replaces the local transaction time with the local header processor time in the authorization request message.

If the difference is within the predefined threshold, the local transaction time is validated and sent with authorization request message.

Figure 3:
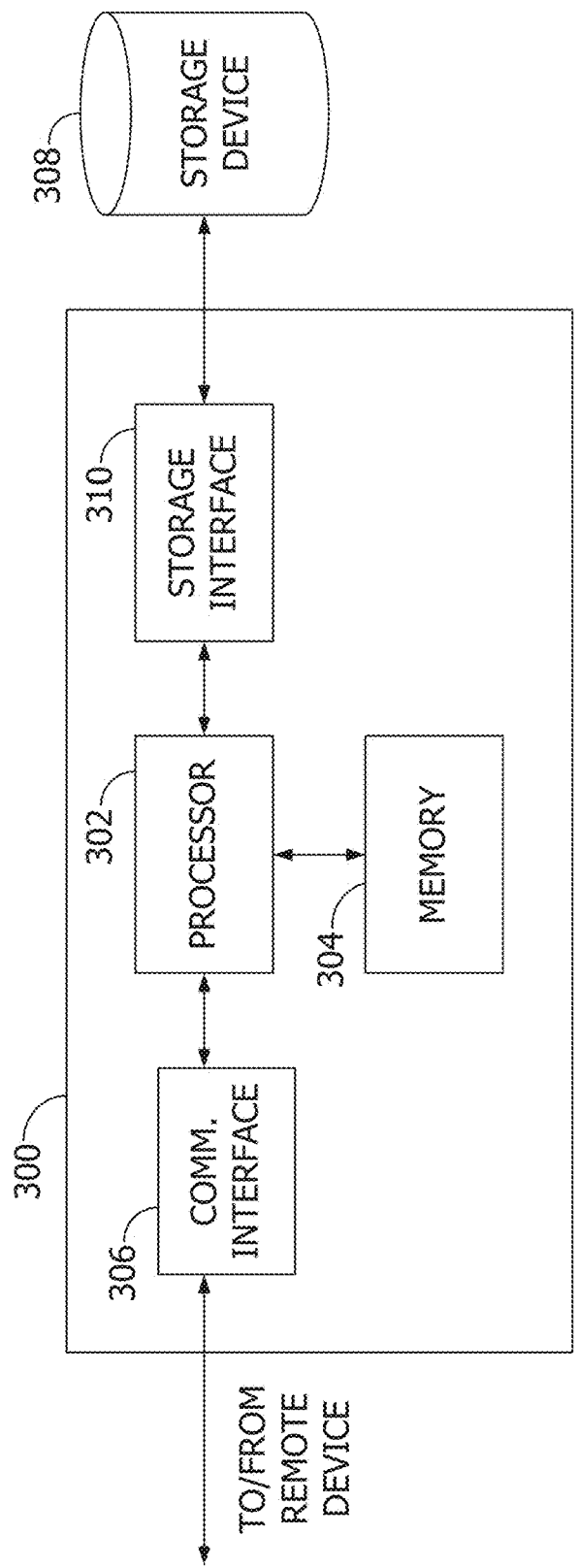
FIG. 3 illustrates an example configuration of a server system.

FIG. 3 illustrates an example configuration of a host system 300. Host system 300 may include, but is not limited to, server system 202, message validator computing device 212, and/or host computing system 214 (all shown in FIG. 2). In the example embodiment, host system 300 determines and analyzes characteristics of devices used in payment transactions, as described below.

Host system 300 includes a processor 302 for executing instructions. Instructions may be stored in a memory area 304, for example. Processor 302 may include one or more processing units (e.g., in a multi-core configuration) for executing instructions. The instructions may be executed within a variety of different operating systems on the host system 300, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 302 is operatively coupled to a communication interface 306 such that host system 300 is capable of communicating with a remote device such as a user system or another host system 300. For example, communication interface 306 may receive authorization request messages from interchange network 108 via the Internet, as illustrated in FIG. 1.

Processor 302 may also be operatively coupled to a storage device 308. Storage device 308 is any computer-operated hardware suitable for storing and/or retrieving data. In some embodiments, storage device 308 is integrated in host system 300. For example, host system 300 may include one or more hard disk drives as storage device 308. In other embodiments, storage device 308 is external to host system 300 and may be accessed by a plurality of server systems 301. For example, storage device 308 may include multiple storage units such as hard disks or solid state disks in a redundant array of inexpensive disks (RAID) configuration. Storage device 308 may include a storage area network (SAN) and/or a network attached storage (NAS) system.

In some embodiments, processor 302 is operatively coupled to storage device 308 via a storage interface 310. Storage interface 310 is any component capable of providing processor 302 with access to storage device 308. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 302 with access to storage device 308.

Memory area 304 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
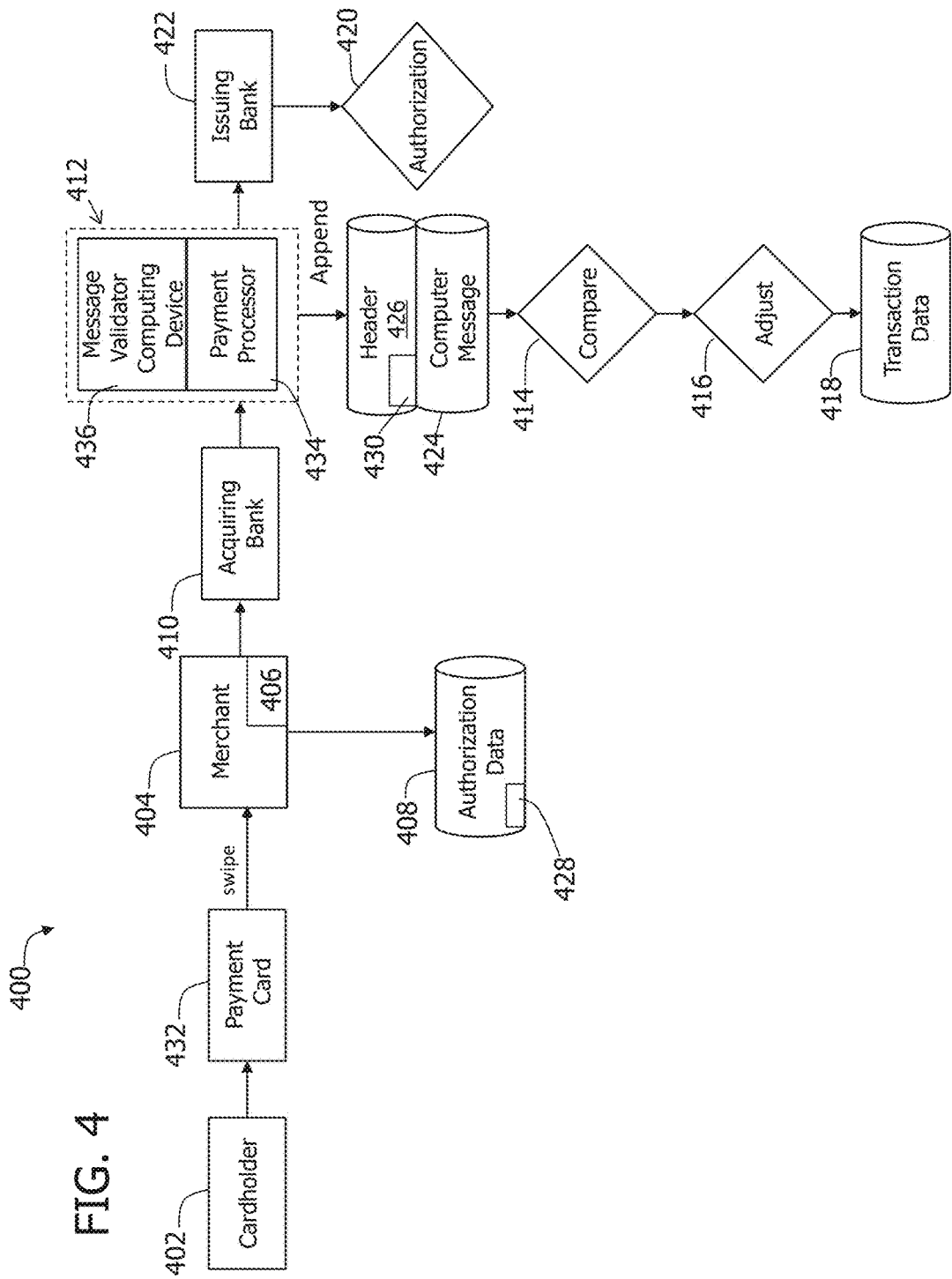
FIG. 4 is a data flow block diagram illustrating an example of time verification and modification.

FIG. 4 depicts data flow block diagram illustrating an example of a time verification and adjustment system 400. More specifically, the data flow block diagram illustrates verifying a local transaction time 428 associated with a transaction and adjusting the local transaction time 428 when it is invalid. In the example embodiment, system 400 includes (a) a cardholder 402, (b) a merchant 404, (c) a remote computing device (or POS) 406, (d) authorization data 408, (e) an acquiring bank 410, (f) a host computing system 412, (g) a comparison 414 to determine whether or not the local transaction time 428 is verified, (h) an adjustment 416 to the time when the local transaction time 428 is not verified, (i) transaction data 418, (j) an authorization process 420, (k) an issuing bank 422, (l) a computer message 424, (m) a header 426 appended to the computer message 424, (n) local transaction time 428, (o) a header processor time 430, and (p) a payment card 432.

In the example embodiment, host computing system 412 includes a payment processor 434 and a message validator computing device 436. The functions of host computing system 412 as described herein may be performed by payment processor 434 and/or message validator computing device 436.

In an example embodiment, cardholder 402 initiates a transaction by "swiping" payment card 436 at remote computing device 406 (or POS) associated with merchant 404. In other embodiments, cardholder 402 may initiate the transaction using a different method, such as submitting a payment card number associated with payment card 436 to remote computing device 406. When the transaction is initiated, remote computing device 406 is configured to collect data associated with the transaction by reading payment card 436. In the example embodiment, the collected data includes authorization data 408. Authorization data 408 gathered from payment card 436 by remote computing device 406 may include, but is not limited to, an account identifier (e.g., a PAN), a cardholder name, a merchant identifier, a merchant location identifier (e.g., a postal code and/or additional location information associated with merchant 404), and/or a local transaction time 428. Remote computing device 406 sends authorization data 408 via computer message 424 to acquiring bank 410 associated with merchant 404. In the example embodiment, computer message 424 is an authorization request message. Acquiring bank 410 then sends computer message 424 to host computing system 412 associated with cardholder 402.

Host computing system 412 receives computer message 424 with authorization data 408 from acquiring bank 410 and assigns header processor time 428 to the transaction. In the example embodiment, header processor time 428 is associated with a recorded time of an internal clock when computer message 424 was received by host computing system 412. Header processor time 430 may be considered to be an accurate time relative to local transaction time 428. Host computing system 412 is configured to append a header 426 to computer message 424. Header 426 includes header processor time 430. To compare local transaction time 428 to header processor time 428, host computing system 412 is configured to adjust header processor time 428 to an appropriate time zone (i.e., the time zone associated with merchant 404 or remote computing device 406). In other embodiments, host computing system 412 is configured to adjust header processor time 428 based on other time differences, such as daylight savings time. The adjusted header processor time 428 is referred to as the "local header processor time" (not shown in FIG. 4).

Host computing system 412 then compares 414 the local header processor time to local transaction time 428 to determine a difference. When the difference is within a predetermined time range or threshold, local transaction time 428 is stored with authorization data 408 from computer message 424 within host computing system 412 as transaction data 418. In an example embodiment, the predefined threshold is six seconds. In other embodiments, the predefined threshold may be a different time, such as fifteen seconds. When the difference between the local header processor time and local transaction time 428 is greater than the predefined threshold, local transaction time 428 is adjusted 416 to the local header processor time and stored with authorization data 408 within host computing system 412 as transaction data 418.

Host computing system 412 then transmits computer message 424 with transaction data 418 to issuing bank 424 to start authorization process 420. Issuing bank 424 associated with cardholder 402 receives computer message 424 and analyzes transaction data 418 to determine if cardholder 402 has an account at issuing bank 414, an account of cardholder 402 is in good standing, and/or the account of cardholder 402 has enough funds to cover the transaction. When the transaction of cardholder 402 is approved by issuing bank 424, issuing bank 424 sends the authorization to remote computing device 406 associated with merchant 404 to complete the transaction. When the transaction of cardholder 402 is not approved, issuing bank 424 transmits a message to remote computing device 406 associated with merchant 404. The message informs remote computing device 406 that the transaction has been denied.

Figure 5:
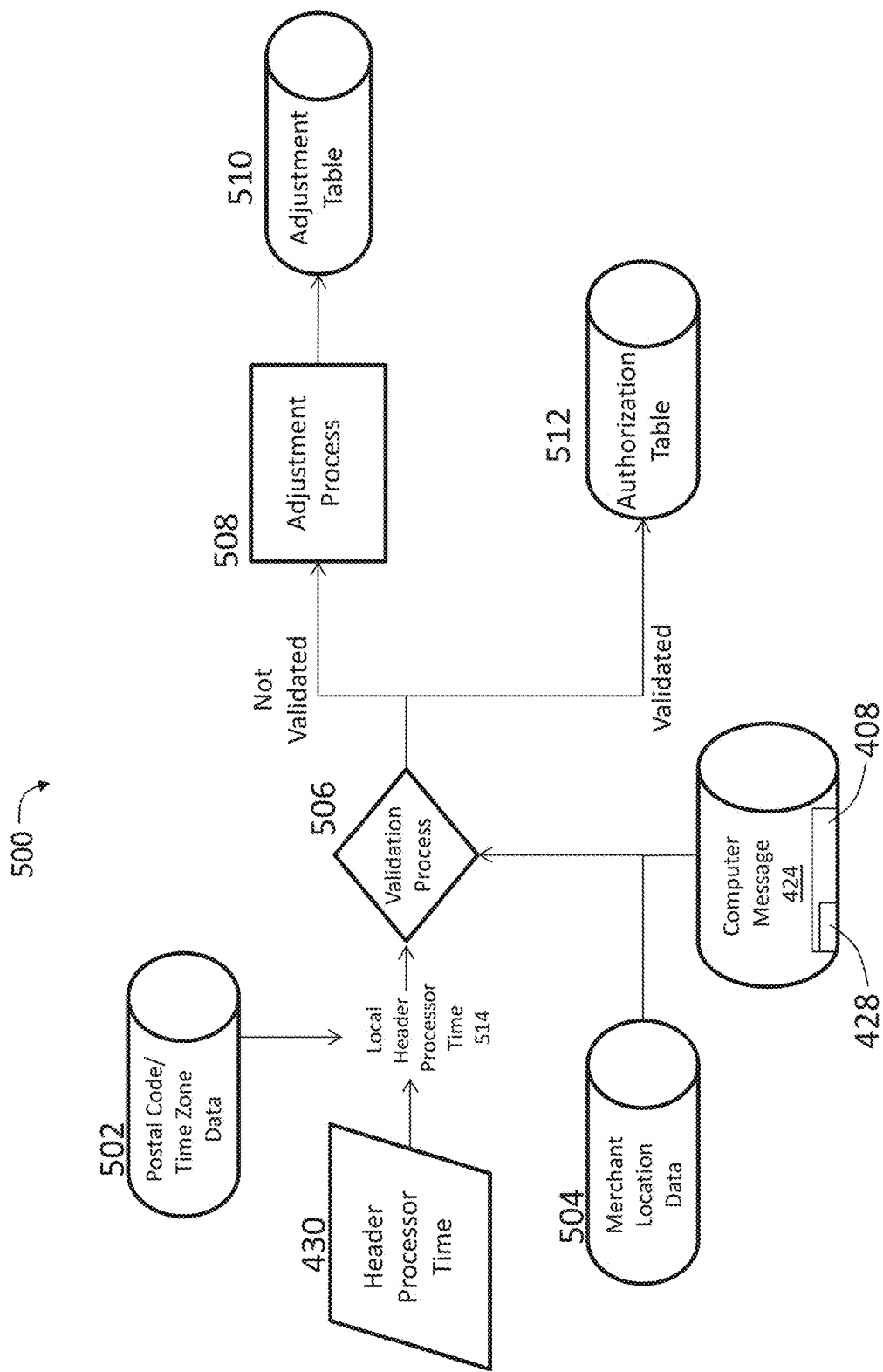
FIG. 5 is a schematic example of a data flow diagram depicting an example of a verification and adjustment system.

FIG. 5 is an example data flow diagram of a time validation and adjustment process 500 for validating a local transaction time (e.g., local transaction time 428, shown in FIG. 4) associated with a transaction and adjust the local transaction time based on the validation. System 400 shown in FIG. 4 may be configured to perform process 500. In the example embodiment, process 500 includes (a) authorization data 408, (b) computer message 424, (c) local transaction time 428, (d) header processor time 430, (e) postal code and time zone data 502, (f) merchant location data 504, (g) a validation process 506, (h) an adjustment process 508, (i) an adjustment table 510, (j) an authorization table 512, and (k) a local header processor time 514. In other embodiments, process 500 includes additional, fewer, or alternative steps and components.

Process 500 begins at host computing system 412 (shown in FIG. 4) after receipt of computer message 424. When host computing system 412 receives the authorization data 408 within computer message 424, host computing system 412 assigns header processor time 430 to computer message 424 as a header (e.g., header 426, shown in FIG. 4). To validate 506 local transaction time 428, header processor time 430 is adjusted to generate local header processor time 514. In the example embodiment, host computing system 412 determines local header processor time 514 based on postal code and time zone data 502, merchant location data 504, and header processor time 430. In at least some embodiments, postal code and time zone data 502 and merchant location data 504 may be included in computer message 424. In other embodiments, postal code and time zone data 502 and/or merchant location data 504 may be stored in tables within a database (e.g., database 210, shown in FIG. 2). Host computing system 412 uses merchant location data 504 to determine a time zone associated with the merchant. In at least some embodiments, host computing system 412 may use merchant location data 504 to determine a time zone associated with a POS device of the merchant (e.g., POS device 406, shown in FIG. 4). Host computing system 412 adjusts header processor time 430 to the time zone where the merchant is located to generate local header processor time 514.

For example, a computer message 424 is received in Central time and is assigned a header processer time 430 of 10:00:00 AM. Based on information from computer message 424, the merchant location is determined to be in Florida within Eastern Time. To compare header processor time 430 and a local transaction time 428 of computer message 424, header processor time 430 is converted to Eastern Time based on postal code and time zone data 502. Eastern Time is one hour ahead of Central Time and therefore the local header processor time 514 is 11:00:00 AM.

Validation process 506 is configured to validate local transaction time 428 when local transaction time 428 is within a predefined threshold of local header processor time 514. The predefined threshold is determined by host computing system 412. In some embodiments, the difference between local transaction time 428 and local header processor time 514 is determined at host computing system 412 by subtracting local transaction time 428 from local header processor time 514. The result is then compared to the predefined threshold. If the difference between local transaction time 428 and local header processor time 514 is within the threshold (e.g., six seconds) then local transaction time 428 is validated. For example, local transaction time is 6:00:00 PM and local header processor time is 6:00:04 PM. The difference is 6:00:04−6:00:00=00:00:04; 00:00:04 is less than 00:00:06, therefore local transaction time 428 is validated. Local transaction time 428 is then stored in authorization table 512 for authorization. In at least some embodiments, host computing system 412 transmits computer message 424 with local transaction time 428 to a payment network that includes authorization table 512.

In the example embodiment, local transaction time 428 is not validated when the difference between local transaction time 428 and local header processor time 514 exceeds the predefined threshold. Local transaction time 428 is adjusted 508 to (or replaced by) local header processor time 514. For example, local transaction time 428 is 6:00:00 PM and local header processor time 514 is 6:00:15 PM. The difference is 15 seconds. 15 seconds is greater than six seconds, therefore local transaction time 428 is not validated. In the example embodiment, local transaction time 428 is adjusted to 6:00:15 PM and stored in adjustment table 510.

Adjustment table 510, also referred to herein as "time adjustment table" 510, is stored at host computing system 412. Adjustment table 510 stores data related to the transaction and process 500 as an adjustment record. The adjustment record for each transaction includes (a) the difference between local transaction time 428 and local header processor time 514, (b) an indicator whether the adjustment was a date adjustment (i.e., local transaction time 428 is reporting the incorrect date) or a time adjustment, (c) local transaction time 428, (d) adjusted local transaction time, (e) local header processor time 514, (g) an identifier of a POS device associated with the transaction, (h) an identifier associated with acquiring bank 410 (shown in FIG. 4), and (i) an identifier associated with merchant 404 (shown in FIG. 4). In some embodiments, the adjustment records may include more or fewer data fields.

In at least some embodiments, host computing system 412 is configured to retrieve adjustment records from adjustment table 510 associated with a merchant, bank, and/or remote computing device. Host computing system 412 calculates an average time difference for the merchant, bank, and/or remote computing device. In some embodiments, host computing system 412 adjusts the local transaction time based on the average time difference.

Figure 6:
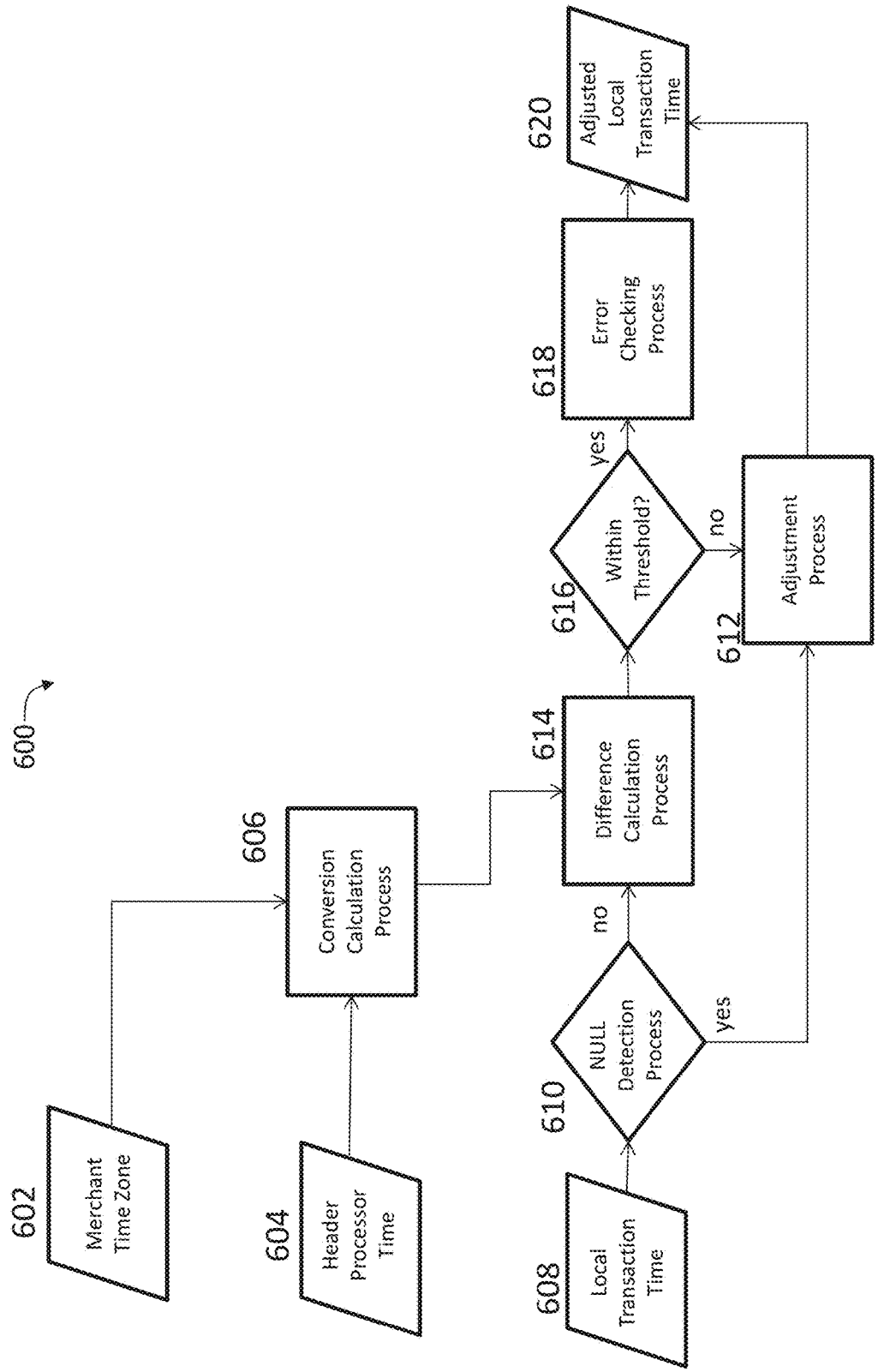
FIG. 6 is a schematic example diagram depicting an example time verification and adjustment process.

FIG. 6 is an example data flow diagram depicting a time validation and adjustment process 600. More specifically, process 600 is used to validate a local transaction time 608 associated with a transaction and adjusting the local transaction time 608 when it is incorrect. Process 600 may be implemented by a host computing system, such as host computing system 412, shown in FIG. 4. In the example embodiment, process 600 depicted includes (a) computer message 424 (shown in FIG. 4), (b) local header processor time 514 (shown in FIG. 5), (c) a merchant time zone 602, (d) a header processor time 604, (e) a conversion calculation process 606, (f) local transaction time 608, (g) a NULL detection process 610, (h) an adjustment process 612, (i) a difference calculation process 614, (j) a range determination process 616, (k) an error checking process 618, and (l) an adjusted local transaction time 620.

In the example embodiment, merchant time zone 602 and header processor time 604 are used to calculated local header processor time 514. Local header processor time 514 is considered by host computing system 412 to be an accurate time relative to local transaction time 608. Merchant time zone 602 is the time zone where a merchant associated with the transaction (or a remote computing device of the merchant) is located. For example, if the merchant is located in Florida, the merchant is located in the Eastern Time Zone and merchant time zone 602 is Eastern Time. Header processor time 604 is a recorded time on the internal clock of host computing system 412 when computer message 424 is received.

Conversation calculation process 606 includes merchant time zone 602 and header processor time 604. Header processor time 604 is converted to local header processor time 514 based on merchant time zone 602. For example, if the merchant is located in California, merchant time zone 602 is Western Time. If header processor time 604 is 7:00:00 PM Central Time, local header processor time 514 is calculated by subtracting two hours or 120 minutes from header processor time 604 to convert header processor time from Central Time to Western Time. Local header processor time 514 is 5:00:00 PM.

Host computing system 412 receives local transaction time 608 as part of computer message 424. Host computing system 412 checks if local transaction time 608 is NULL during NULL detection process 610. If local transaction time 608 is NULL (i.e., there is no value given for local transaction time 608) then local transaction time 608 is adjusted 612 to header processor time 604 or local header processor time 514. Local transaction time 608 is also assigned an "exception" status to indicate local transaction time 608 was adjusted in adjustment process 612.

When local transaction time 608 is not NULL (i.e., local transaction time 608 has a value) then difference calculation process 614 is performed by host computing system 412. Difference calculation process 614 includes local header processor time 514 and local transaction time 608. Difference calculation process 614 determines a time difference between local header processor time 514 and local transaction time 608. In some embodiments, local transaction time 608 is subtracted from local header processor time 514. In one example difference calculation process 614, local transaction time 608 may be 3:00:00 PM and local header processor time 514 may be 3:00:04 PM. The time difference is calculated to be four seconds.

Once the time difference is determined, host computing system 412 determines a threshold for evaluating local transaction time 608. In at least some embodiments, the threshold is predefined. In the example embodiment, the threshold is determined based on computer message 424 and/or the transaction. Host computing system 412 determines 616 whether or not the time difference is within the determined threshold, i.e., if local transaction time 608 is sufficiently approximate to the local header processor time 514 to be validated. If the difference is outside or exceeds the threshold (e.g., six seconds), local transaction time 608 is tagged with an "exception" status and is adjusted 612 to local header processor time 514. When the time difference is greater than 24 hours, the adjustment is considered a "date adjustment". A date adjustment indicates, for example, the merchant is reporting the transaction is occurring on Dec. 23, 2016 and host computing system 412 is receiving computer message 424 on Dec. 24, 2016 at approximately the same time.

When the time difference is within the threshold, local transaction time 608 is validated and is used in error checking process 618. In the example embodiment, during error checking process 618, host computing system 412 is configured to compare local transaction time 608 to local header processor time 514 minus the time difference calculated in difference calculation process 614 as described further herein. Host computing system 412 is further configured to identify any correctable errors associated with local transaction time 608. For example, local transaction time 608 may be configured in an incorrect time zone. Host computing system 412 may be configured to automatically correct these errors by adjusting local transaction time 608. Once local transaction time 608 has been adjusted or validated, local transaction time 608 is stored as adjusted local transaction time 620. If adjusted local transaction time 620 has an "exception" status, adjusted local transaction time 620 is stored in an adjustment table with additional information associated with the transaction. Otherwise, adjusted local transaction time 620 is stored in an authorization table.

Figure 7:
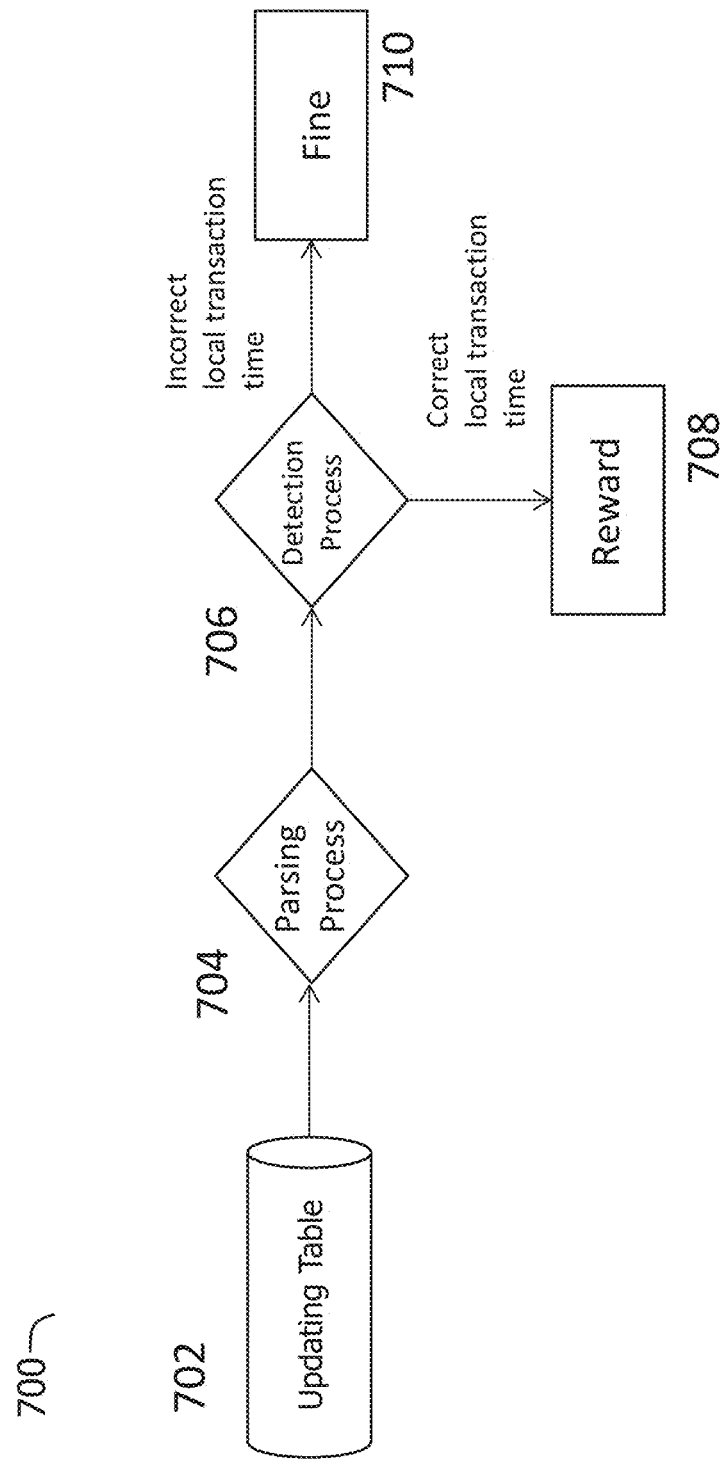
FIG. 7 is a schematic example diagram data flow depicting an updating and alerting process.

FIG. 7 is an example data flow diagram depicting an updating and alerting process 700. More specifically, process 700 informs an acquiring bank and/or a merchant associated with a remote computing device of an incorrect local transaction time. Process 700 may be performed by a host computing system, such as host computing system 400 shown in FIG. 4. Process 700 includes (a) an updating table 702, (b) a parsing process 704, (c) a detection process 706, (d) a reward process 708, and (e) a fine process 710. In other embodiments, process 700 may include additional, fewer, or alternative steps.

Updating table 702 maintains data relating to transactions associated with acquiring banks, merchants, and remote computing devices. Data within updating table 702 indicates (a) if the local transaction time has been adjusted, (b) what type of adjustment was made to the local transaction time (i.e., time or date adjustment), (d) a time difference between the local transaction time and the local header processor time, (e) an identifier associated with the acquiring bank, (f) an identifier associated with the acquiring bank the merchant, and (g) an identifier associated with the remote computing device.

The host computing system is configured to maintain updating table 702. The host computing system updates updating table 702 as it verifies and adjusts incoming local transaction times for one or more transactions. Updating table 702 maintains data associated with the transactions to enable the host computing system to track the performance of the acquiring bank, the merchant, and/or the remote computing device and to detect corrupted or poor data. Poor data integrity may negatively affect the host computing system internally. Data associated with one or more transactions received at the host computing system enables the host computing system to determine if the merchant is open for business or if the remote computing device is authorized to run transactions.

The host computing system uses the data within updating table 702 for parsing process 704. In the example embodiment, parsing process 704 parses the data stored within updating table 702 to identify a local transaction time and whether or not the local transaction time was adjusted for each transaction. The host computing system performs detection process 706 to identify and analyze time adjustments. For example, detection process 706 may be used to detect remote computing devices with incorrect internal clocks. To detect the incorrect internal clock on a remote computing device, the host computing system parses the data in updating table 702 to identify all records where the local transaction time was adjusted for either a time adjustment or a data adjustment using parsing process 704 and detection process 706. After the data is parsed, a list of acquiring banks, merchants, and remote computing devices associated with adjusted local transaction times is generated by the host computing system.

In some embodiments, the host computing system may provide a reward for banks, merchants, and remote computing devices associated with validated or correct local transaction times using rewarding process 708. The host computing system may generate a list of the banks, the merchants, and the remote computing devices associated with validated local transaction times during detection process 706. Based on the generated list, the host computing system determines rewards for the banks and merchants. The reward may include, for example, a discount, a reimbursement, additional services, a coupon, and/or a gift. Alternatively, the host computing system may not reward the banks and merchants.

In the example embodiment, the host computing system performs fine process 710 after generating a list during detection process 706 of banks, merchants, and remote computing devices associated with local transaction times that have been adjusted. Fine process 710 identifies the acquiring banks, merchants, and remote computing devices that have repeatedly reported time that required adjustment (i.e., unreliable data, data with poor integrity) based on the generated list. In at least some embodiments, the acquiring bank, the merchants, and the remote computing devices on the generated list are notified to prevent further time adjustments. In one embodiment, the acquiring bank and/or merchant may be issued a fine based on fine process 710. Alternatively, the host computing system may not issue fines and/or notifications.

Figure 8:
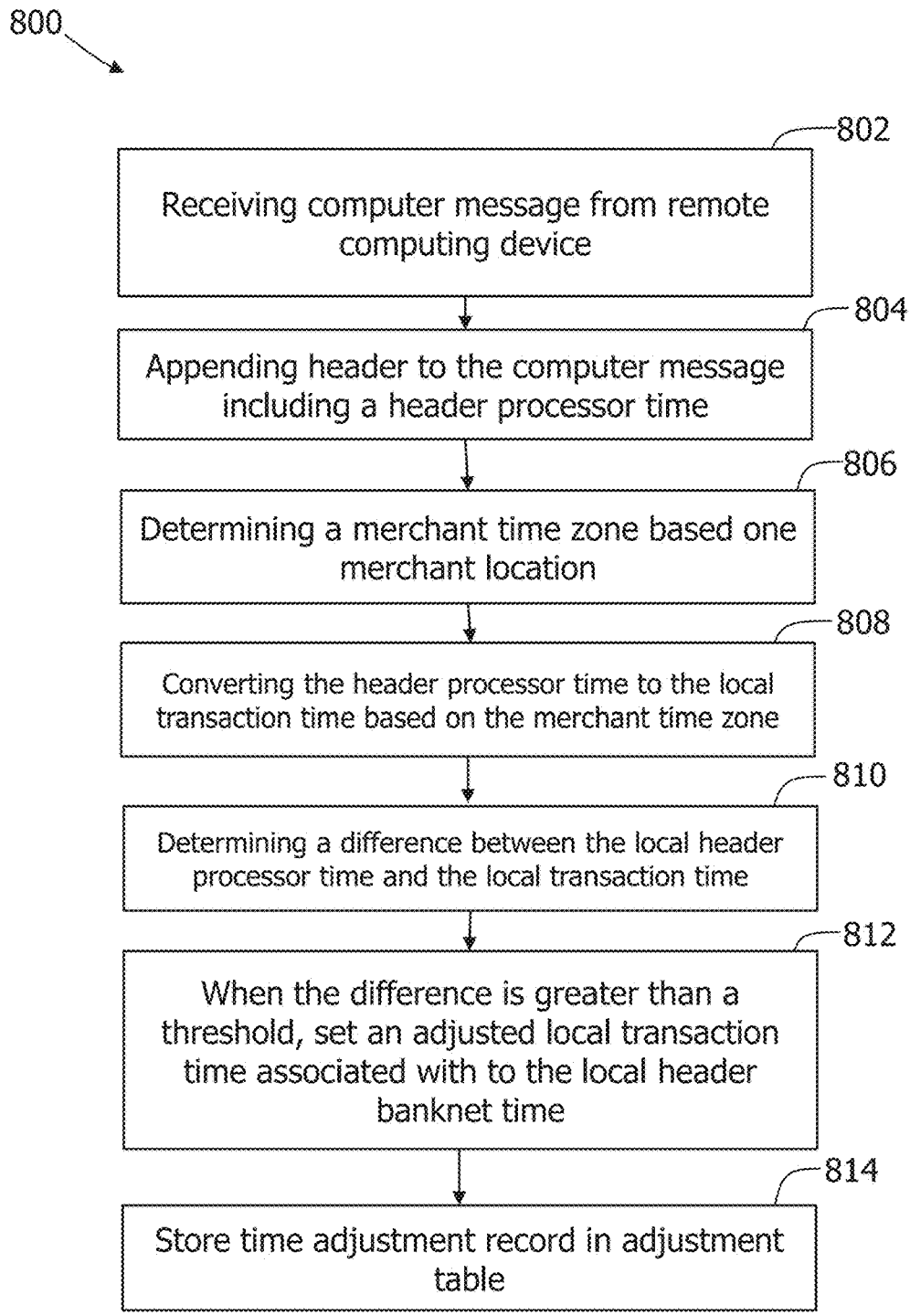
FIG. 8 is an example computer-implemented method for verifying and adjusting local transaction time.

FIG. 8 is a depiction of an example computer-implemented method 800 for verifying and adjusting local time of a transaction. In at least some embodiments, method 800 is performed by a host computing system (e.g., host computing system 412, shown in FIG. 4). In other embodiments, method 800 may include additional, fewer, or alternative steps to perform the functions described herein.

The host computing system receives 802 a computer message including authorization data associated with one or more transactions from a remote computing device. The remote computing device is associated with a merchant and each of the transactions associated with the computer message. In the example embodiment, the computer message is an authorization request message. The host computing system appends 804 a header to the computer message. The header includes a header processor time associated with the computer message that the host computing system recorded or assigned when the computer message was received.

The host computing system then determines 806 a merchant time zone associated with each transaction. The host computing system may determine 806 the merchant time zone based on a location of the merchant or the remote computing device. The host computing system then calculates a local header processor time by converting 808 the header processor time based on the merchant time zone. In some embodiments, the local header processor time is the same as the header processor time. The host computing system determines 810 a time difference between the local transaction time and the local header processor time by subtracting the local transaction time from the local header processor time. In the example embodiment, the host computing system determines an intra-hour time difference (i.e., the time difference does not account for hours). When the intra-hour difference between the local header processor time and the local transaction time is greater than a threshold, the host computing system adjusts 812 the local transaction time to the local header processor time. If the difference is less than the threshold, the local transaction time is validated. In at least some embodiments, the host computing system may identify a correctable error in the local transaction time (i.e., wrong time zone) and automatically adjust the local transaction time. The adjusted local transaction time or the validated local transaction time for each transaction is stored 814 in an adjustment table at the host computing system. In the example embodiment, the host computing system generates a time adjustment record for each transaction including the local transaction time and stores 814 the time adjustment records in the adjustment table.

FIG. 9 illustrates an example formula 900 for calculating an intra-hour difference between a local transaction time and a local header processor time. Formula 900 may be used by a host computing system (e.g., host computing system 412, shown in FIG. 4). In at least some embodiments, formula 900 is used in difference calculation process 614 shown in FIG. 6. Formula 900 is configured to receive a local header processor time and a local transaction time associated with a transaction.

Formula 900 is used in some embodiments to ensure that when the local transaction time is earlier than the local header processor time. Due to time taken to process and communicate an authorization request message associated with the transaction, the local transaction time occurs before the local header processor time is assigned at the host computing system. Formula 900 is configured to identify received local transaction times that occur after the local header processor time. In the example embodiment, when the local header processor time and the local transaction time are in the same time zone and the local transaction time occurs after the local header processor time, formula 900 is configured to generate a value that exceeds the threshold to cause the host computing system to adjust the local transaction time.

In one example, formula 900 is used to determine the intra-hour difference between a local header processor time (i.e., LocalHeaderProcessorTime) and a local transaction time (i.e., LocalTransactionTime). In the example, the local header processor time and the local transaction time each include a minutes portion and a seconds portion to prevent calculation errors caused by incorrect time zone adjustments. In other embodiments, the local header processor and the local transaction time may include additional or fewer portions, such as an hour portion. Formula 900 takes the minutes portion of the local header processor time and multiplies it by 60 to convert the minutes into seconds, then adds the seconds portion of the local header processor time. Similarly, the minutes portion from the local transaction time is multiplied by 60 to convert the minutes into seconds and combined with the seconds portion of the local transaction time. The local transaction time is then subtracted from the local header processor time. In the example embodiment, a factor T is added and the result is reduced by module T In the example embodiment, factor T represents an hour converted into seconds (T=3600 s). In other embodiments, factor T represents a different portion of time, such as half of an hour (T=1800 s). When the total exceeds the threshold value, an exception status is generated by the host computing system to indicate the local transaction time is to be adjusted. When the result of formula 900 is within the threshold value, the local transaction time is deemed to be automatically correctable by the host computing system or validated. In the example embodiment, formula 900 determines an intra-hour difference and does not account for hour offsets. For example, the local transaction time may in an incorrect time zone. As described further herein, the host computing system is configured to determine whether or not to adjust the local transaction time based on the intra-hour difference.

In one example, a local transaction time of a transaction is 1:36:42 PM and a local header processor time of the transaction is 1:37:01 PM. The time zone is an hour time zone (i.e., T is equal to 3600). The threshold determined by the host computing system is 15 seconds. In the example embodiment, formula 900 would be IntraHourDifferenceInSeconds(1:37:01, 1:36:42)=(37*60+1-36*60-42+3600) %3600=19. Since 19 is greater than 15 (the threshold value), the local transaction time is considered inaccurate and is assigned an "exception" status. The status is recorded in a time adjustment table and the local transaction time is adjusted to the local header processor time.

In another example, a local transaction time of a transaction is 1:37:04 PM and a local header processor time of the transaction is 1:37:01 PM. The time zone is an hour time zone. In the example, formula 900 is calculated as IntraHourDifferenceInSeconds(1:37:01, 1:37:04)=(37*60+1−37*60−4+3600)=3597% 3600=3597. Although the absolute time difference is 3 seconds, an exception (or error for incorrect time) is recorded because the time difference is negative. As shown in the example, adding factor T and modulating the difference between the local header processor time and the local transaction time by factor T enables the host computing system to identify negative differences as exceptions and prevent errors caused by the local transaction time and the local header processor time being in different time zones. The local transaction time is adjusted to the local header processor time.

FIG. 10 is an example adjustment formula 1000 for adjusting a local transaction time. Formula 1000 may be used after calculating an intra hour difference with formula 900 (shown in FIG. 9). Formula 1000 may be used by a host computing system during adjustment process 612 (shown in FIG. 6). In the example embodiment, adjustment process 1000 includes the result from intra hour difference formula 900, (b) a threshold value, and (c) an adjusted local transaction time.

The result of formula 900 (i.e., IntraHourDifferenceInSeconds) is compared to the threshold value. When the result is less than or equal to the threshold value, a local transaction time associated with the result of formula 900 is validated. The adjusted local transaction time is calculated by subtracting the result of formula 900 from a local header processor time. The adjusted local transaction time is the local transaction time. In some embodiments, formula 1000 does not subtract the result of formula 900 from the local header processor time to calculate the adjusted local transaction time, but rather maintains the local transaction time for future analysis. In the example embodiment, the adjusted local transaction time (adjustedLocalTransactionDateTime) is compared to the local transaction time to determine if there is a time zone offset. If there is a time zone offset (i.e., the adjust local transaction time and the local transaction time are in different time zones), the host computing system may be configured to automatically adjust the local transaction time to account for the time zone offset. When the result for the intra hour difference in seconds formula is greater than the threshold value, the adjusted local transaction time is set to the local header processor time. The adjusted local transaction time is stored in a time adjustment table and added to a computer message (e.g., an authorization request message) for processing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A host computing system for automatically validating and adjusting local transaction times included in a computer message transmitted by a remote computing device, said host computing system in communication with the remote computing device and comprising a processor and a memory in communication with the processor, wherein said processor is configured to:
  receive, from the remote computing device, the computer message comprising authorization data associated with a transaction, the authorization data including a location identifier and a local transaction time set by the remote computing device used in processing the transaction;
  append a header to the computer message, wherein the header includes a header processor time associated with the host computing system;
  determine a time zone associated with the local transaction time based on the location identifier;
  convert the header processor time to a local header processor time based on the time zone; and
  determine whether the local transaction time is validated based on the local header processor time and the local transaction time, thereby improving integrity of data received from the remote computing device.

2. The host computing system of claim 1, wherein said processor is further configured to:
  compare the local transaction time and the local header processor time;
  determine a difference between the local transaction time and the local header processor time; and
  compare the difference to a threshold value.

3. The host computing system of claim 2, wherein said processor is further configured to:

adjust the local transaction time to the local header processor time when the difference exceeds the threshold value.

4. The host computing system of claim 3, wherein said processor is further configured to:
   generate an adjustment record associated with the transaction, the adjustment record including the adjusted local transaction time and the difference; and
   store the adjustment record in a time adjustment table, the time adjustment table comprising a plurality of adjustment records.

5. The host computing system of claim 4, wherein said processor is further configured to:
   identify the remote computing device based on the computer message;
   retrieve at least one adjustment record of the plurality of adjustment records associated with the remote computing device from the time adjustment table;
   determine an average difference of the retrieved adjustment records for the remote computing device; and
   store the average difference in the time adjustment table.

6. The host computing system of claim 5, wherein the processor is further configured to adjust the local transaction time based on the average difference associated with the remote computing device stored in time adjustment table.

7. The host computing system of claim 4, wherein each adjustment record of the plurality of adjustment records includes data fields for at least one of a type of adjustment, a difference between the header processor time and the local transaction time, a merchant ID, an acquiring bank ID, a remote computing device ID, and the local header processor time.

8. The host computing system of claim 2, wherein said processor is further configured to:
   validate the local transaction time when the difference is between zero and the threshold value.

9. The host computing system of claim 2, wherein the threshold value is between 1 and 15 seconds.

10. The host computing system of claim 2, wherein the processor is further configured to:
    determine the difference between the local transaction time and the local header processor time according to:

$$(\text{minute}(LocalHeaderProcessorTime)*60 \\ + \text{second}(LocalHeaderProcessorTime) \\ - \text{minute}(LocalTransactionTime) * 60 \\ - \text{second}(LocalTransactionTime) + T \\ ) \% T;$$

wherein T is one of 1800 and 3600, and wherein the difference is an intra-hour difference.

11. The host computing system of claim 10, wherein the processor is further configured to:
    adjust the local transaction time according to:

```
if IntraHourDifferenceInSeconds < threshold
    adjustedLocalTransactionTime =
        localHeaderProcessorTime -
        intraHourDifferenceInSeconds
else
    adjustedLocalTransactionTime =
        localHeaderProcessorTime.
```

12. A computer-implemented method for automatically validating a local transaction time included in a computer message transmitted by a remote computing device, said method comprising receiving, at a host computing system from the remote computing device, the computer message comprising authorization data associated with a transaction, the authorization data including a location identifier and a local transaction time set by the remote computing device used in processing the transaction;
appending a header to the computer message, wherein the header includes a header processor time associated with the host computing system;
determining, with the host computing system, a time zone associated with the local transaction time based on the location identifier;
converting the header processor time to a local header processor time based on the time zone; and
determining, with the host computing system, that the local transaction time is validated based on the local header processor time and the local transaction time, thereby improving integrity of data received from the remote computing device.

13. The computer-implemented method of claim 12 further comprising:
    comparing the local transaction time and the local header processor time;
    determining, with the host computing system, a difference between the local transaction time and the local header processor time; and
    comparing the difference to a threshold value.

14. The computer-implemented method of claim 13 further comprising adjusting, with the host computing system, the local transaction time to the local header processor time when the difference exceeds the threshold value.

15. The computer-implemented method of claim 14 further comprising:
    generating, with the host computing system, an adjustment record associated with the transaction, the adjustment record including the adjusted local transaction time and the difference; and
    storing the adjustment record in a time adjustment table, the time adjustment table comprising a plurality of adjustment records.

16. The computer-implemented method of claim 15 further comprising:
    identifying, with the host computing system, the remote computing device based on the computer message;
    retrieving at least one adjustment record of the plurality of adjustment records associated with the remote computing device from the time adjustment table;
    determining, with the host computing system, an average difference of the retrieved adjustment records for the remote computing device; and
    storing the average difference in the time adjustment table.

17. The computer-implemented method of claim 16 further comprising adjusting the local transaction time based on the average difference associated with the remote computing device stored in time adjustment table.

18. The computer-implemented method of claim 15, wherein each adjustment record of the plurality of adjustment records includes data fields for at least one of a type of adjustment, a difference between the header processor time and the local transaction time, a merchant ID, an acquiring bank ID, a remote computing device ID, and the local header processor time.

19. The computer-implemented method of claim 13 further comprising validating the local transaction time when the difference is between zero and the threshold value.

20. The computer-implemented method of claim 13, wherein the threshold value is between 1 and 15 seconds.

21. The computer-implemented method of claim 13, where determining, the difference further comprises:
determining, with the host computing system, the difference between the local transaction time and the local header processor time according to:

$$( \text{minute(LocalHeaderProcessorTime)} * 60 \\ + \text{second(LocalHeaderProcessorTime)} \\ - \text{minute(LocalTransactionTime)} * 60 \\ - \text{second(LocalTransactionTime)} + T \\ ) \% T;$$

wherein T is one of 1800 and 3600, and wherein the difference is an intra-hour difference.

22. The computer-implemented method of claim 21 further comprising:
adjusting, with the host computing system, the local transaction time according to:

```
if IntraHourDifferenceInSeconds < threshold
    adjustedLocalTransactionTime =
        localHeaderProcessorTime −
        intraHourDifferenceInSeconds
else
    adjustedLocalTransactionTime =
        localHeaderProcessorTime.
```

23. At least one non-transitory computer-readable storage media having computer-executable instructions embodied thereon, wherein when executed by at least one processor, the computer-executable instructions cause the processor to:
receive, at a host computing system from a remote computing device, a computer message comprising authorization data associated with a transaction, the authorization data including a location identifier and a local transaction time set by the remote computing device used in processing the transaction;
append a header to the computer message, wherein the header includes a header processor time associated with the host computing system;
determine a time zone associated with the local transaction time based on the location identifier;
convert the header processor time to a local header processor time based on the time zone; and
determine that the local transaction time is validated based on the local header processor time and the local transaction time, thereby improving integrity of data received from the remote computing device.

24. The computer-readable storage media in accordance with claim 23, wherein the computer-executable instructions further cause the processor to:
compare the local transaction time and the local header processor time;
determine a difference between the local transaction time and the local header processor time; and
compare the difference to a threshold value.

25. The computer-readable storage media in accordance with claim 24, wherein the computer-executable instructions further cause the processor to adjust the local transaction time to the local header processor time when the difference exceeds the threshold value.

26. The computer-readable storage media in accordance with claim 25, wherein the computer-executable instructions further cause the processor to:
generate an adjustment record associated with the transaction, the adjustment record including the adjusted local transaction time and the difference; and
store the adjustment record in a time adjustment table, the time adjustment table comprising a plurality of adjustment records.

27. The computer-readable storage media in accordance with claim 26, wherein the computer-executable instructions further cause the processor to:
identify the remote computing device based on the computer message;
retrieve at least one adjustment record of the plurality of adjustment records associated with the remote computing device from the time adjustment table;
determine an average difference of the retrieved adjustment records for the remote computing device; and
store the average difference in the time adjustment table.

28. The computer-readable storage media in accordance with claim 27, wherein the computer-executable instructions further cause the processor to adjust the local transaction time based on the average difference associated with the remote computing device stored in time adjustment table.

29. The computer-readable storage media in accordance with claim 26, wherein each adjustment record of the plurality of adjustment records includes data fields for at least one of a type of adjustment, a difference between the header processor time and the local transaction time, a merchant ID, an acquiring bank ID, a remote computing device ID, and the local header processor time.

30. The computer-readable storage media in accordance with claim 24, wherein the computer-executable instructions further cause the processor to validate the local transaction time when the difference is between zero and the threshold value.

31. The computer-readable storage media in accordance with claim 24, wherein the threshold value is between 1 and 15 seconds.

32. The computer-readable storage media in accordance with claim 24, wherein the computer-executable instructions further cause the processor to:
determine the difference between the local transaction time and the local header processor time according to:

$$( \text{minute(LocalHeaderProcessorTime)} * 60 \\ + \text{second(LocalHeaderProcessorTime)} \\ - \text{minute(LocalTransactionTime)} * 60 \\ - \text{second(LocalTransactionTime)} + T \\ ) \% T;$$

wherein T is one of 1800 and 3600, and wherein the difference is an intra-hour difference.

33. The computer-readable storage media in accordance with claim 32, wherein the computer-executable instructions further cause the processor to:
adjust the local transaction time according to:

```
if IntraHourDifferenceInSeconds < threshold
    adjustedLocalTransactionTime =
        localHeaderProcessorTime −
        intraHourDifferenceInSeconds
else
    adjustedLocalTransactionTime =
        localHeaderProcessorTime.
```

* * * * *